Nov. 24, 1931.  W. M. JORDAN  1,833,581
FISHING LURE
Filed June 24, 1931

INVENTOR.
William M. Jordan.
BY
ATTORNEY.

Patented Nov. 24, 1931

1,833,581

UNITED STATES PATENT OFFICE

WILLIAM M. JORDAN, OF BIRMINGHAM, ALABAMA, ASSIGNOR TO SOUTH BEND BAIT COMPANY, OF SOUTH BEND, INDIANA

FISHING LURE

Application filed June 24, 1931. Serial No. 546,581.

REISSUED AUG 20 1935

The invention relates to fishing lures, and particularly to improvements in lures having an elongated plate body, and has for its object to provide a lure of this character with a weight secured at the under side of its forward end whereby the body will be held in operative upright position with the hook held in upwardly extending position while passing through the water.

A further object is to provide a lure of this character in which a relatively thin elongated plate carries a hook and a weight, and in which the means securing said weight to the plate also serves to secure said hook in operative relation to the plate.

A further object is to provide a lure of this character comprising an elongated plate having a pair of apertures formed in its trailing end adapted to respectively receive the shank of a hook carried by the plate and securing means for a bangle adapted to extend rearwardly of the plate.

A further object is to provide a lure of this character in which the line attaching means is secured to the shank of the hook, thus relieving the body plate of the stress incident to the use of the lure in landing fish.

A further object is to provide a lure of this character comprising an elongated plate, a weight carried thereby, and a hook operatively positioned by the cooperation of the plate and weight.

With the above and other objects in view, the invention resides in the combination and arrangement of parts as hereinafter set forth, shown in the drawings, described and claimed, it being understood that changes may be made in the precise embodiment of the invention without departing from the spirit of the invention.

Figure 1:
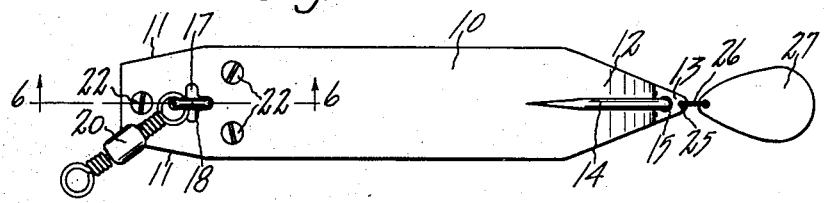
Figure 1 is a top plan view of the lure.
Figure 2:
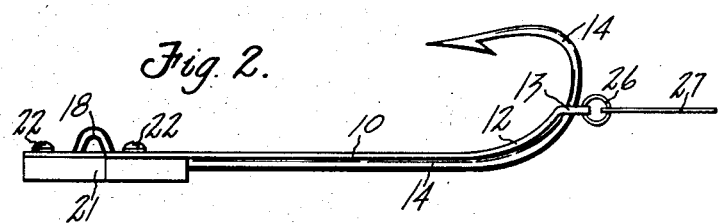
Figure 2 is a view of the lure in side elevation.
Figure 3:
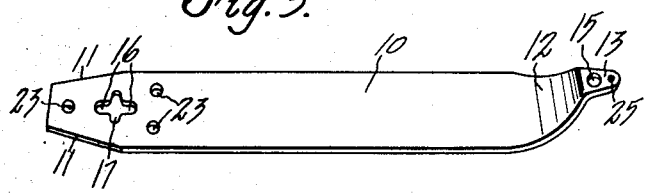
Figure 3 is a perspective view of the lure body.
Figure 4:
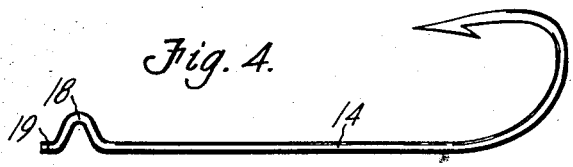
Figure 4 is a side view of the hook.
Figure 5:
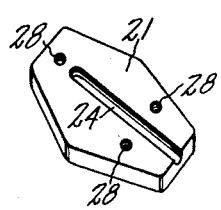
Figure 5 is a perspective view of the weight carried by the body.
Figure 6:
Figure 6 is a longitudinal vertical sectional view taken on line 6—6 of Figure 1.

Referring to the drawings, which illustrate the preferred embodiment of the invention, the numeral 10 designates the lure body which is formed of a relatively thin elongated plate, preferably of metal, whose sides preferably taper forwardly inwardly at the front thereof, as at 11. The body is curved upwardly at 12 adjacent its rear end and terminates in a portion 13 extending rearwardly from curved portion 12 in substantially parallel relation to the forward portion of the body, the body preferably tapering rearwardly at the curved portion 12 and the end portion 13 thereof. A hook 14, preferably single pronged, is carried by body 10 with its shank extending longitudinally of the body at the under side thereof. The curved portion of the hook shank extends upwardly through an aperture 15 formed in portion 13 of the body 10 adjacent the curved portion 12 of the body, and the prong of the hook extends forwardly above the body. The body 10 has a pair of intersecting slots 16 and 17 formed therein adjacent the forward end thereof, the slot 16 extending longitudinally of the body, and the slot 17 extending transversely of the body. An upwardly directed U-shaped bend 18 is formed in the hook shank adjacent its forward end 19 and is adapted to project upwardly of the body by passing through the longitudinal slot 16, and the forward end 19 of the hook shank underlies the body forwardly of said slot. A line attaching swivel 20 is secured to the bend 18 of the hook shank above the body.

A weight 21 is secured to the forward end of body 10 at the under side thereof by means of screws 22 passing through apertures 23 forming in body 10 and threaded into tapped holes 28 in the weight. The weight 21 is preferably of hexagonal shape with its forward edges conforming with the tapered sides and front edge of the body, and with its rear edges tapering inwardly of the sides of the body. The upper face of the weight 21 is longitudinally grooved at 24 from the rear end thereof to a point adjacent its forward end, and the forward end of the hook shank fits into this groove and is securely held thereby with respect to the body 10.

A small aperture 25 is formed in the end portion 13 of the body 10 rearwardly of aperture 15, and is adapted to receive a ring 26 to which a spangle plate 27 is secured, whereby said spangle may have a universal or fluttering movement at the rear of the body as the lure is drawn through the water.

The lure is assembled as follows: The shank of the hook 14 is passed through aperture 15 in the rear portion 13 of the body 10, and the end of the shank is positioned below the slot 16 at the forward end of the body. The end of swivel 20 is then passed downwardly through the transverse slot 17, and the end of the hook shank is passed through a loop in the end of the swivel. The swivel is then drawn upwardly through the transverse slot and brings with it the U-shaped bend 18 of the hook shank which projects through the longitudinal slot with the forward end of the hook shank 19 engaging the under side of the body. The weight 21 is then positioned at the forward under side of plate 10 with the hook shank positioned in the groove 24 thereof, and is secured to the plate 10 by screws 22. The lure is thus assembled with the line attaching swivel 20 locked on the U-shaped bend of the hook shank in a manner whereby the pull of the line is exerted directly on the hook shank, and the hook shank is positioned in engagement with the body, which forms a reinforcement therefor. Thus the plate 10 is not subjected to any stress in the use of the lure and serves only to hold the other parts of the lure in operative relation and to provide, in combination with the weight, the desired action of the lure in its movement through the water by means of its tapering head end and its curved rear end. Furthermore, by this assembly, the screws 22 secure the hook shank in operative relation to the body in addition to securing the weight thereto. The spangle 25 extending rearwardly of the body, and carried thereby, is preferably of a light reflecting material adapted to attract the attention of fish as it flutters and oscillates when drawn through the water.

It will also be seen that the lure is constructed and assembled in a manner to permit easy disassembly and replacement of the parts thereof; and only a minimum number of securing means are required to secure and hold the parts of the lure in operative assembled relation.

This invention is an improvement over Patents #1,606,078, Nov. 9, 1926, and #1,657,966, Jan. 31, 1928, issued to me.

The invention having been set forth, what is claimed as new and useful is:

1. A lure comprising an elongated plate, a weight carried by the forward end of said plate, a hook having its shank extending longitudinally of said plate at the under side thereof, said plate having an aperture in its trailing end through which the shank of said hook extends whereby the pointed end of said hook projects above said plate, and means securing said weight to said plate, and in addition securing the end of said hook shank in operative relation to said plate.

2. A lure comprising an elongated plate curved upwardly adjacent its rear end and terminating in a rearwardly extending portion having an aperture therein, a hook having the curved portion of its shank projecting through said aperture and having the straight portion of its shank extending longitudinally forwardly of said body at the under side thereof, a weight carried by the forward end of said body, and means securing said weight to said body and in addition securing the end of said hook shank in operative relation to said body.

3. A lure comprising an elongated plate having an aperture formed in spaced relation to the rear end thereof, a hook having its shank projecting through said aperture and extending longitudinally of said plate, a weight carried by said plate at the forward end thereof, means securing said weight to said plate and the forward end of said hook shank in operative relation to said plate, and a spangle secured to said plate rearwardly of said hook receiving aperture.

4. A lure comprising an elongated plate having a pair of longitudinally spaced apertures formed in the rear end thereof, a hook having its shank extending through the forward aperture and longitudinally of said plate, a weight carried by the forward end of said body, securing means operatively securing the forward end of said hook shank and said weight to said body, a spangle extending rearwardly of said body, and means passing through the rear aperture of said plate to secure said spangle to said plate.

5. A lure comprising a relatively thin elongated plate having an aperture formed adjacent the rear end thereof, a hook having its shank extending longitudinally of said plate and through said aperture, a weight carried by said body, and means securing said weight to said body and in addition securing said hook shank to said body.

6. A lure comprising a relatively thin elongated plate, a hook carried by said plate and having its shank extending longitudinally thereof, a weight carried by the forward end of the plate, and means securing said weight to said plate and in addition fixedly securing said hook shank to said plate.

7. A lure comprising a relatively thin elongated plate, a hook carried by said plate and having its shank extending longitudinally thereof, a weight carried by the forward end of the plate, and means securing said weight to said plate and cooperating with said weight to secure said hook shank in operative relation with said plate.

8. A lure comprising an elongated plate having an aperture formed adjacent the rear end thereof, a hook having its shank extending longitudinally of said plate and passing through said aperture, a weight carried by said plate and having a longitudinal groove formed in the inner face thereof to receive said hook shank, and means for securing said weight to said body, said hook shank being secured and positioned relative to said plate by said weight and aperture.

9. A lure comprising an elongated plate having an aperture formed adjacent the rear end thereof, a hook having its shank extending longitudinally of said plate at the under side thereof and passing through said aperture, a weight carried by the forward end of said plate at the under side thereof, said weight having a longitudinally extending groove formed in its inner face to receive the forward end of said hook shank, and means for securing said weight to said plate.

10. A lure comprising an elongated plate having an aperture formed adjacent the rear end thereof and a longitudinal slot formed adjacent the forward end thereof, a hook having its shank extending longitudinally of said body and passing through said aperture, said hook shank having a U-shaped portion formed in its forward end and extending into said slot, and a weight carried by said body and overlying the hook shank to hold said U-shaped portion within said slot.

11. A lure comprising an elongated plate having an aperture formed adjacent the rear end thereof and a longitudinal slot formed adjacent the forward end thereof, a hook having its shank extending longitudinally of said plate at the under side thereof and passing through said aperture, said hook shank having a U-shaped bend formed in its forward end and extending through said slot, a weight carried by the forward end of said plate at the under side thereof and having a longitudinal groove formed in its inner face to receive said hook shank, and means for securing said weight to said plate.

12. A lure comprising an elongated plate having an aperture formed adjacent the rear end thereof, said plate having intersecting longitudinal and transverse slots formed adjacent the forward end thereof, a hook having its shank extending longitudinally of said plate at its under side and passing through said aperture, said hook having a U-shaped bend adjacent its forward end extending through said longitudinal slot, a line attaching means having a loop engaging said U-shaped bend and insertible through said transverse slot to encircle the U-shaped bend of said hook shank in the assembling of the lure, a weight carried by the forward under side of the plate having a longitudinal slot in its inner face to receive said hook shank, and means for securing said weight to said plate.

13. A lure comprising an elongated plate having a slot therein adjacent its leading edge, a hook having its shank extending longitudinally of said plate, said shank having a bent portion which extends through said slot, a weight carried by said plate and having a longitudinal groove formed therein for the reception of said shank and permitting said weight to overlie said shank to operatively position said hook relative to said plate.

14. A lure comprising a relatively thin elongated plate, a hook carried by said plate, and a weight carried by said plate at the forward under side thereof to prevent overturning of said plate and to facilitate diving erratic movement of the plate as it is drawn through the water, the outer surface of said weight conforming to the under surface of said plate.

15. A lure comprising a relatively thin elongated plate, a weight carried by said plate at and below the level of the forward end thereof, and a hook comprising a shank carried by said plate and a pointed end extending longitudinally of said plate in close parallel relation thereto and adjacent the rear end thereof.

16. A lure comprising a relatively thin elongated plate, a weight carried by said plate at and below the level of the forward end thereof to prevent overturning of said plate and to facilitate lateral reciprocatory movement of the plate as it sinks in the water, and a hook carried by said plate comprising a point disposed adjacent the rear end thereof.

17. A lure comprising a relatively thin elongated plate, a weight carried by said plate at and below the level of the forward end of said plate to facilitate lateral reciprocatory movement of the plate as it sinks in the water and to prevent overturning of the plate, a hook carried by said plate with its barb disposed adjacent the rear end thereof, means secured to the rear end of the lure for movement independently thereof to retard sinking of the rear end of said lure, and means at the forward end of said lure for attachment of a fish line thereto.

18. A lure comprising a relatively thin elongated plate, a hook having its shank extending longitudinally of said plate, a weight carried by the forward end of said plate, means securing said weight to said plate and also securing the forward end of said hook shank to said plate, and means securing said hook shank to said plate adjacent the rear end of the plate.

19. A lure comprising a relatively thin elongated plate, a weight carried by said plate at the forward end thereof, a hook having its shank extending longitudinally of said plate and its barb disposed adjacent the rear end thereof, means fixedly securing said hook shank to said plate, means secured to the rear end of said lure and movable independently thereof to retard sinking of the rear end of said lure, and line attaching means carried by the forward end of said lure.

20. A lure comprising a relatively thin elongated plate, a weight fixedly carried by the forward end of said plate and cooperating therewith to form a weighted head projecting below the plate, said weighted head preventing overturning of the lure and facilitating erratic diving movement thereof, and a hook carried by said plate.

21. A lure comprising a relatively thin elongated plate, a weight fixedly carried by the forward end of the plate and cooperating therewith to form a weighted head projecting below the plate, said weighted head preventing overturning of the lure and facilitating erratic diving movement thereof, a hook carried by the plate with its shank extending longitudinally thereof, and means securing said hook shank to said plate at the forward and rear ends thereof.

In testimony whereof I affix my signature.

WILLIAM M. JORDAN.